United States Patent [19]

Abbes et al.

[11] Patent Number: 4,640,530
[45] Date of Patent: Feb. 3, 1987

[54] TIGHT CONNECTION DEVICE

[75] Inventors: Claude Abbes, St. Etienne; Christian Rouaud, Bourg St. Andeol; Jean Valla, St. Etienne; Robert Forges, Bollene; Raymond de Villepoix, Donzére, all of France

[73] Assignee: Commissariat a l'Energie Atomique, Paris, France

[21] Appl. No.: 602,372

[22] Filed: Apr. 20, 1984

[30] Foreign Application Priority Data

Apr. 27, 1983 [FR] France ................................ 83 06962

[51] Int. Cl.⁴ ............................................. F16L 23/00
[52] U.S. Cl. ..................................... 285/18; 285/336; 285/353; 285/365; 285/368; 285/408; 285/411
[58] Field of Search ............... 285/364, 365, 366, 406, 285/407, 408, 410, 353, 233, 411, 233, 367, 409, 420, 323, 18, 336; 403/388, 335

[56] References Cited

U.S. PATENT DOCUMENTS

| | | | |
|---|---|---|---|
| 448,717 | 3/1891 | Hogan | 285/406 |
| 903,260 | 11/1908 | Youmans | 285/411 |
| 2,023,060 | 12/1935 | Vetrano | 285/129 |
| 2,688,500 | 9/1954 | Scott | 285/364 |
| 2,778,661 | 1/1957 | Leighton | 285/233 |
| 2,967,723 | 1/1961 | Willis | 285/233 |
| 3,216,745 | 11/1965 | Oey | 285/91 |
| 4,128,921 | 12/1978 | Heinze et al. | 285/408 |
| 4,150,847 | 4/1979 | De Cenzo | 285/233 |
| 4,469,354 | 9/1984 | Caldwell | 285/408 |

FOREIGN PATENT DOCUMENTS

| | | | |
|---|---|---|---|
| 511690 | 12/1953 | Belgium | 285/407 |
| 851292 | 10/1952 | Fed. Rep. of Germany | 285/365 |
| 1217013 | 11/1958 | France . | |
| 1507450 | 1/1967 | France . | |
| 2206827 | 5/1974 | France . | |
| 348297 | 8/1960 | Switzerland . | |
| 17432 | of 1912 | United Kingdom | 285/365 |
| 745847 | 8/1954 | United Kingdom . | |
| 928699 | 6/1963 | United Kingdom . | |
| 1112421 | 12/1964 | United Kingdom . | |
| 1194436 | 6/1970 | United Kingdom | 285/278 |

Primary Examiner—Cornelius J. Husar
Assistant Examiner—Anthony Knight
Attorney, Agent, or Firm—Kerkam, Stowell, Kondracki & Clarke

[57] ABSTRACT

The device makes it possible to connect tightly first and second parts having a flange and locking or tightening means for the said flanges. The tightening or locking force applied to the locking of tightening means is multiplied in order to increase the compression force applied to a gasket or joint. Each flange has a conical surface of axis D and angle $\lambda$. The device has two clips, each of which has a conical surface of axis D and angle $\mu$, as well as an intermediate member in the form of a ring constituted by several interconnected segments and having an inner surface and an outer surface. Each inner peripheral surface has a conical surface of axis D and angle $\lambda$ able to cooperate with the conical surface of axis D and angle $\lambda$ of the first and second parts. Each outer peripheral surface has a conical surface of axis D and angle $\mu$ able to cooperate with the conical surfaces of angle $\mu$ of the clips.

15 Claims, 14 Drawing Figures

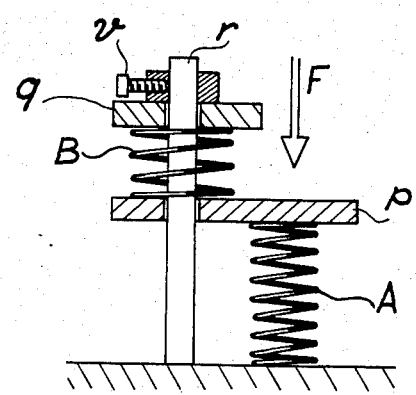
FIG. 1a
FIG. 1b
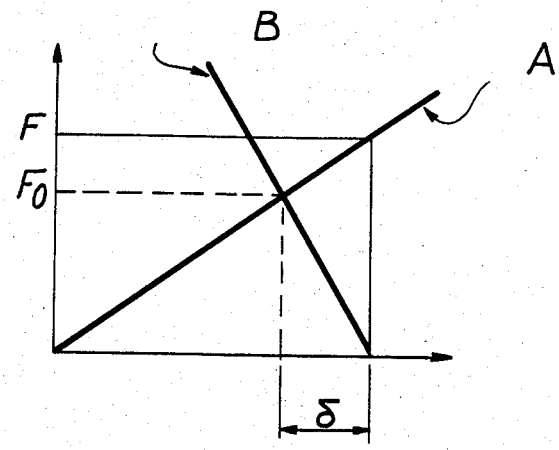

TIGHT CONNECTION DEVICE

BACKGROUND OF THE INVENTION

The present invention discloses a device for the tight connection of two parts, e.g. pipes, each part having a flange. The device has flange locking means, in order to compress a gasket between the two parts.

A tight connection device of this type is disclosed e.g. by French Patent Application No. 8,101,250, filed on Jan. 23rd 1981 in the name of the Commissariat à l'Energie Atomique and entitled "Elastic locking tightening device". This device has locking or tightening means of the screw-nut type, which join the parts to one another, in order to compress a gasket between them.

In some industrial applications, in order to ensure a connection between pipes with high sealing and reliability performance levels, the use of couplings having a static gasket requiring high tightening forces, such as a metal gasket, is required. However, a tightening or locking device of the type described above cannot ensure such a high tightening force or stress.

In addition, in order to simplify or automate tightening, it is often necessary to use a mechanical means of the hydraulic or electric jack type, in order to lock the assembly and crush the gasket in accordance with the assembly specifications. This makes it possible to simplify the closing of the locking or tightening system, because no stress is exerted thereon. For example, if this tightening system is a nut and bolt system, the bolts can be manually screwed. This is of particular interest in the case when there is no space to introduce a locking member, such as a locking key. In this case, before eliminating the action of the jack, it is necessary by means of an appropriate system to prestress the assembly, in order to keep it correctly secured. This is brought about by tensioning the locking means, otherwise the elastic reaction of the gasket would bring about the load relief thereof.

In order to simulate this stress maintaining problem, it is merely necessary to form the two elastic elements constituted by the gasket and the locking system by two springs A and B.

FIG. 1a shows an elastic system with two springs A and B. Spring A provides the elasticity of the gasket and spring B that of the locking system. Spring A is compressed by exerting a force F on plate p.

Plate q is locked on spindle r, e.g. by means of a screw v, so that spring B is not compressed. Thus, on taking the example of a nut and bolt system, if the bolts are manually tightened, it is readily apparent that they cannot be tightly locked.

On releasing the force F exerted e.g. by a jack, the spring reaction on plate p, which was previously balanced by the action of the jack, is transmitted to spring B, which is compressed. The point of equilibrium is at $F_0$ (see FIG. 1b). Spring B represents the elasticity of the nut and bolt system. Spring A is relaxed by value $\delta$ and spring B compressed by the same value $\delta$. Thus, the gasket whose elasticity is represented by spring A has loosened. However, in order to correctly ensure the sealing, it is necessary for the gasket to be adequately compressed.

In order to obviate this gasket load relief phenomenon, it is necessary, in the manner indicated hereinbefore, to prestress the tightening system by tensioning the same. However, this is not possible in all cases, particularly due to lack of space.

SUMMARY OF THE INVENTION

The object of the present invention is a tight connection device making it possible to considerably reduce the tightening or locking force to be applied to the assembly. It also makes it possible to eliminate the tensioning of the locking means, whereby a jack is used for securing the connection.

These advantages are obtained through the presence of a mechanical system making it possible to reduce the locking force and considerably increase the displacement of the locking members compared with the displacement of the flanges compressing the gasket. More specifically, in a connection device according to the invention for connecting first and second parts, each flange has a conical surface of axis D and angle $\lambda$. The device incorporates two clips, each having a conical surface of axis D and angle $\mu$, as well as a radially retractable and extensible intermediate member in the form of a ring. The ring is constituted by several interconnected segments and has an inner surface and an outer surface. Each segment has on its inner face a conical surface of axis D and angle $\lambda$ able to cooperate with the conical surface of axis D and angle $\lambda$ of the first and second parts, whilst on its outer face it has a conical surface of axis D and angle $\mu$ able to cooperate with the conical surfaces of angle $\mu$ of each of the clips.

The invention leads to the following advantages. As will be described, the locking device of the invention multiplies a locking force applied to the device so that a desired compressive force on a gasket may be obtained with a smaller applied locking force. This makes it possible to obtain the high forces necessary in certain industrial applications for high sealing and high reliability performance levels using smaller applied locking forces.

Moreover, it greatly increases the displacement of the locking members compared with the displacement of the flanges which compress the gasket. Thus, in the case where a locking means such as a jack is used for tightening the connection, there is no need to tension the tightening system. Thus, the displacement of the clip of the gasket, due to the elasticity of the tightening system, will remain within acceptable limits for the performance of the gasket.

BRIEF DESCRIPTION OF THE DRAWINGS

The invention is described in greater detail hereinafter relative to non-limitative embodiments and the attached drawings, wherein show.

FIG.'s 1a and 1b are diagrammatic views useful in explaining the problems associated with known tight connection devices.

Figure 2:
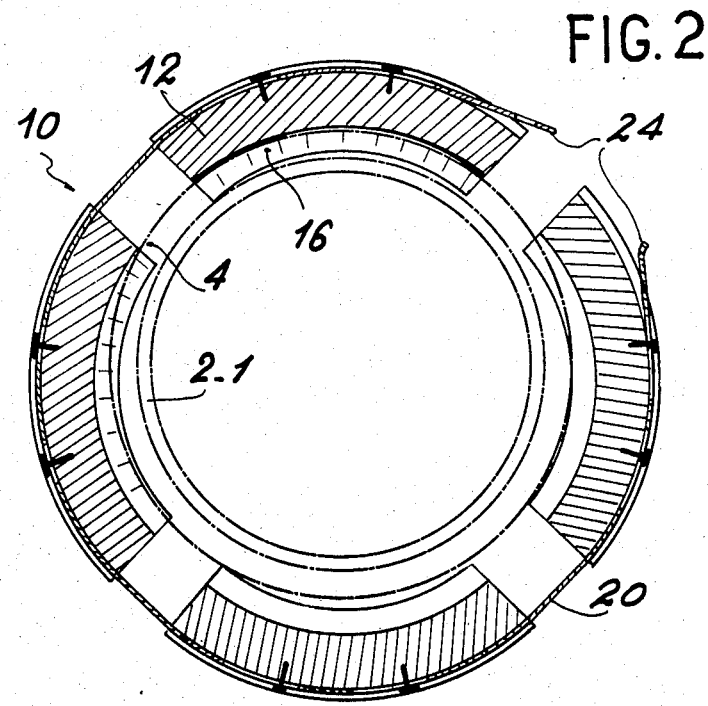

FIG. 2 is a side view of a first embodiment of a ring forming part of the tight connection device according to the invention.

Figure 3:
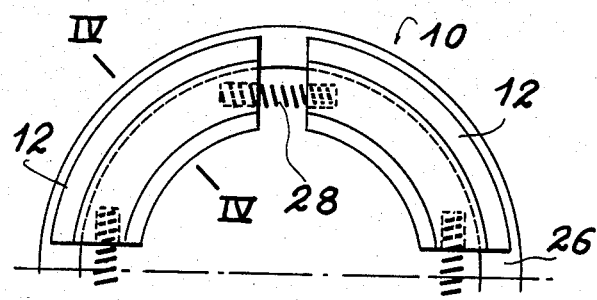

FIG. 3 is a side view diagrammatically showing a second embodiment of a ring forming part of the connection device according to the invention.

Figure 4:
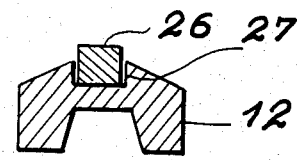

FIG. 4 is a sectional view along line IV—IV of the ring shown in FIG. 3.

Figure 5:
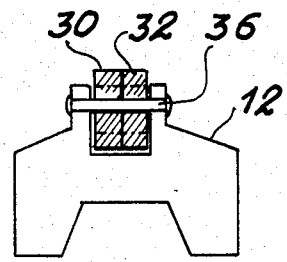

FIG. 5 is a sectional view of a third embodiment of a ring forming part of a connection device according to the invention.

Figure 6:
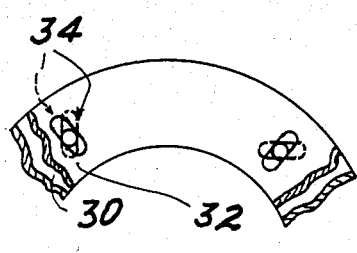

FIG. 6 is a detail showing part of the ring of FIG. 5.

Figure 7:
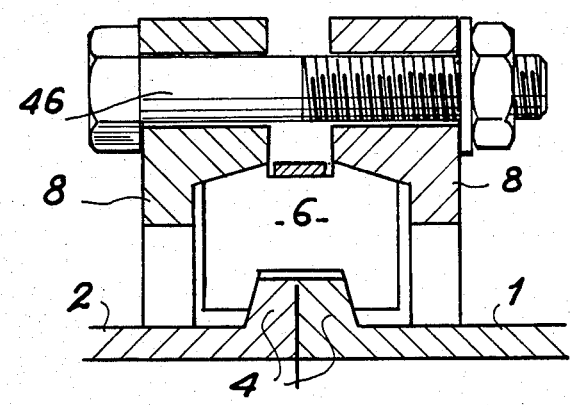

FIG. 7 is a view showing first embodiment of the locking or tightening means for the connection device of the invention.

FIGS. 8A and 8B illustrate the locking of the flanges by means of jacks, FIG. 8a being a sectional view of the connection device and FIG. 8b a view of the same mechanism in the direction of arrow F of FIG. 8A.

Figure 1:
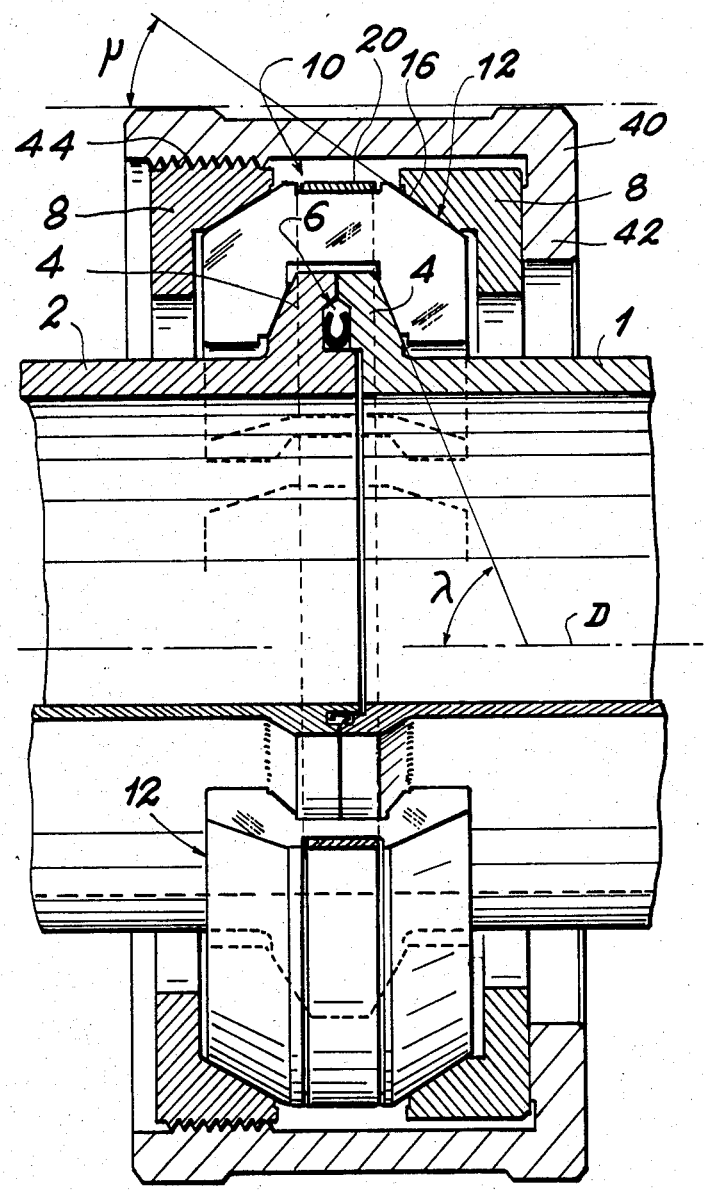
FIG. 1 is a longitudinal section view of a tight connection device according to the invention.
Figure 9:
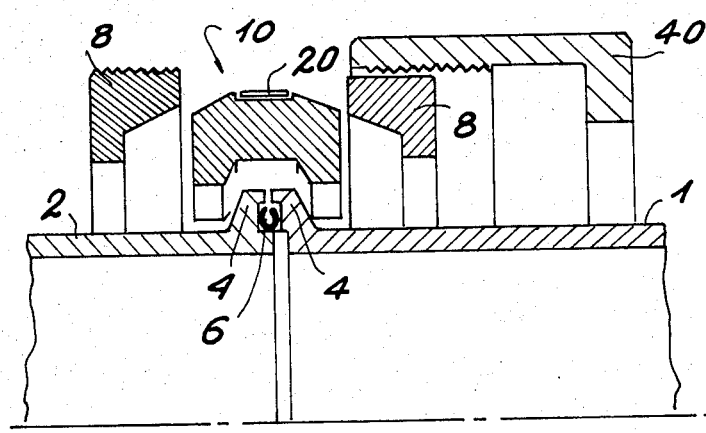

FIG. 9 shows the installation of the connection device of FIG. 1.

Figure 10:
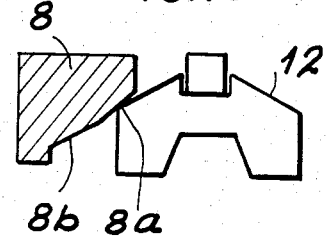
Figure 11:
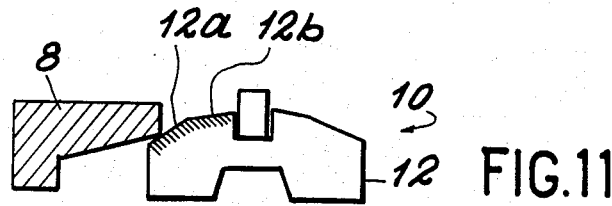

FIGS. 10 and 11 are details showing a constructional variant of the conical surfaces of the locking flanges (FIG. 10) or the ring (FIG. 11).

DETAILED DESCRIPTION OF THE PREFERRED EMBODIMENTS

The tight connection device shown in FIG. 1 makes it possible to connect a first part 1 to a second part 2. For example, parts 1 and 2 are constituted by pipes having a longitudinal axis D.

In the case where these pipes carry a very corrosive liquid, it is necessary to use a completely metal joint requiring a high tightening or locking force in order to connect them in a completely tight manner. The connection device according to the invention makes it possible to considerably reduce the tightening force required to be applied to the assembly in order to obtain the desired tight connection.

Each pipe has a flange 4 and each flange has a conical surface of axis D and angle λ. Angle λ is an acute angle close to 90°, e.g. 75°. The end of pipe 2 is fitted into a recess formed in FIG. 4 of pipe 1. A gasket 6 is fitted to the outer circumference of pipe 1. As explained hereinbefore, the gasket 6 results in an entirely metal joint requiring a high compressive stress in the longitudinal direction D of pipes 1 and 2.

The actual connection device comprises two clips 8, each of which has a conical surface of axis D and angle μ. Angle μ is a small angle e.g. 15°. Each clip 8 is in the form of a circular ring, whose internal diameter exceeds that of pipes 1 and 2. Thus, between clips 8 and each of the flanges 4 is placed an intermediate member 10, in the form of a radially extensible and retractable ring. For this purpose, ring 10 is formed from several segments 12, each of which has an inner peripheral surface and an outer peripheral surface. The inner peripheral surface of each segment 12 is a conical surface of axis D and angle λ for cooperating with the corresponding conical surfaces of flanges 4. The outer peripheral surface of segments 12 has a conical surface 16 of axis D and angle μ for cooperation with the conical surfaces of angle μ of the clips 8.

Segments 12 of ring 10 are interconnected in such a way as to permit the extension and retraction of the segments and several different constructions are possible. For example, in FIG. 1, the segments are connected by a flexible strap 20 fixed to the outer peripheral surface of the segments. Strap 20 has a closing device 24 (see FIG. 2). When ring 10 is in the retracted position, slight undulations form in strap 20. Ring 10 is also visible in the side view of FIG. 10 and consists of four segments 12. Flexible strap 20 is fixed to each of the segments and the closing device 24. The strap can either project or can be fixed in a groove made on the segments in the manner shown in FIGS. 1 and 2.

According to another embodiment shown in FIGS. 3 and 4, the segments 12 are mounted on a metal washer 26 having an appropriate internal diameter which is located in a groove 27 made on the outer peripheral surface of each of the segments 12. The segments are kept spaced from one another by springs 28, fitted into recesses provided for this purpose in said segments. When the locking device is tightened, as described hereinafter, segments 12 move radially inwardly. The internal diameter of washer 26 is selected to be smaller than the minimum external diameter of ring 10 when the locking device is tightened, in order that washer 26 remains in the groove 27 made in the segments. FIG. 4 is a detail showing the section of a segment 12, the groove made in the latter and the metal washer 26.

According to another embodiment shown in FIGS. 5 and 6, the segments are connected to two rings or washers 30, 32, which are located in a groove made on the outer peripheral surface of segments 12. Slots 34 are provided in each segment. For example, if there are four segments, each ring has four slots 34. Slots 34 made on ring 30 are radial, whilst those made on ring 32 are inclined, e.g. by an angle of 45°. A spindle 36, constituted e.g. by a rivet, passes through the slots 34 and is fixed to segments 12. On manually turning washer 30 with respect to washer 32, a radial movement is imparted to the segments, which permits the extension and retraction of ring 10. As a result, it is possible to increase its internal diameter so that it can pass over flanges 4. Then, a radially inwardly directed movement is imparted to segments 12 by rotating washers 30 and 32 in the opposite direction, in such a way as to bring about contacting between the conical surfaces of angle λ of the segments and flanges 4.

As can be seen in FIG. 1, the connection device according to the invention has locking or tightening means making it possible to bring clips 8 close together. In FIG. 1, these means are constituted by an annular member 40 having a flange 42, which bears on one of the clips 8 and cooperates with the other by means of a thread 44 formed on the outer peripheral surface of clip 8. Member 40 is screwed onto clip 8, in order to lock the two clips together.

FIG. 7 shows another locking or tightening means for clips 8. Clips have appropriate openings traversed by a bolt 46. Clips 8 are moved towards one another on screwing down bolt 46. It is also possible to retighten clips 8 by means of jacks exerting opposing forces in a direction parallel to axis D on the sides of clips 8.

Figure 8:
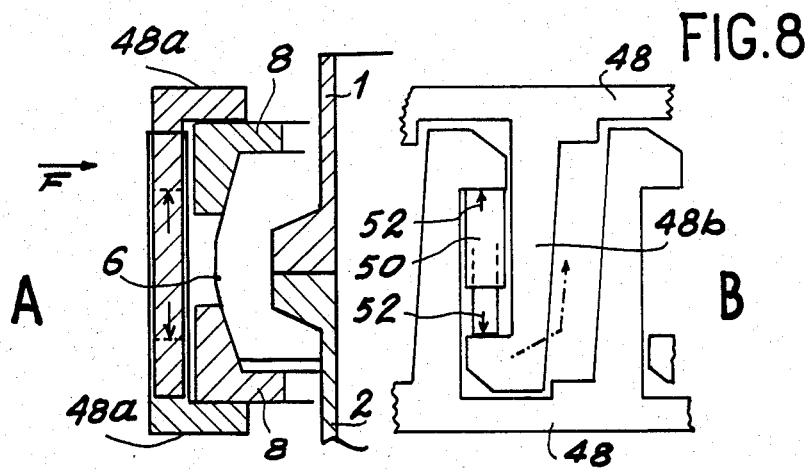

FIG. 8 shows an assembly of the "in opposition" type, making it possible to move the clips 8 together by means of jacks. It comprises two identical annular members 48, whose internal diameter is larger than the external diameter of clips 8. Each member 48 has lugs 48a projecting radially towards the inside, so as to bear on the side of one of the clips 8. The lugs of one of the members bear on a side of one of the clips, whilst the lugs of the other member 48 bear on a side of the other clip. Moreover, each annular member 48 has an L-shaped part 48b. A jack 50 bears on the small branch of part 48b. Jack 50 exerts a force on end parts 48b of the annular members arranged in head to tail manner, so as to move them apart. This has the effect of moving together the lugs 48a of each of the members 48 and consequently to lock clips 8.

FIG. 9 illustrates the assembly of a connection device according to the invention. With pipes 1 and 2 fitted into one another, ring 10 is opened to its maximum diameter. In this position, the internal diameter of the ring is larger than the external diameter of flanges 4. Thus, the ring can be passed over these flanges, followed by the manual locking thereof. The two clips 8 are then positioned on either side of ring 10. Finally, the locking means constituted in the present embodiment by the threaded cylindrical part or bushing 40 are fitted.

This device functions as follows. On screwing down threaded bush 40, onto each of the clips is exerted a radial contact action $$P = \frac{F}{tg(\mu + \phi)},$$

$\phi$ being the friction angle between the conical surface of the clips and the segments 12.

In turn, each segment 12 of the ring exerts on the conical surfaces of flanges 4 a contact action Q parallel to axis D.

$$Q = \frac{P}{tg(90 - \lambda + \phi)}$$

(it being assumed that the friction angle between the conical surfaces of the clip and ring 10 is the same as the friction angle between the conical surfaces of clips 8 and the external conical surface of the ring).

The resultant R of the longitudinal contact action exerted on the flanges is then $$R = \frac{F}{tg(\mu + \phi) \cdot tg(90 - \lambda + \phi)}.$$

For example, if $90 - \lambda = \mu = 15°$, and if the friction coefficient is equal to 0.1, which corresponds to an angle $\phi$ of 6°, a force multiplication coefficient equal to 7.14 is obtained. If, for the same values of $\lambda$ and $\mu$, the friction coefficient is equal to 0.21 (which corresponds to an angle $\phi$ of 12°, the multiplication coefficient is 3.85.

Furthermore, if the total change in the longitudinal distance between clips 8 is equal to (a), this causes a radial displacement of ring 10, $b = a\, tg\mu$, and the radial displacement (b) of ring 10 in turn causes a total longitudinal displacement (c) between the two flanges 4 of $c = a\, tg\mu \cdot tg(90 - \lambda)$. For the values of $\lambda$ and $\mu$ indicated hereinbefore, $c = 1$ mm and (a) is close to 16 mm.

Thus, if the slackening caused by the tensioning of the locking system after eliminating the closing force is $16 \times 1/100$ mm, the load relief at the gasket will only be 1/100 mm, which is accepted by the latter.

FIGS. 10 and 11 show constructional variants for the conical surfaces. In FIG. 10, the conical surfaces of clips 8 are formed by two cones of the same axis, but having different conicity angles. The angle of cone 8a is larger, which permits a faster locking advance movement, but reduces the multiplication coefficient. The conicity angle of cone 8b is smaller, which leads to a higher multiplication coefficient and permits the final locking.

In the variant shown in FIG. 11, the conical surface of the ring 10 is constituted by two conical surfaces 12a, 12b of the same axis, but different conicity angles. The angle of the surface 12a is larger and the angle of the surface 12b smaller. The operation is identical to that described with reference to FIG. 10.

What is claimed is:

1. A device for the tight connection of a first part to a second part in a longitudinal direction along an axis D, the first and second parts having respective first and second flanges, each flange having a conical surface inclined at an angle $\lambda$ with respect to the axis D, the device comprising two longitudinally movable clips, each clip having a conical surface at an angle $\mu$ with respect to axis D, and a radially movable intermediate member in the form of a ring constituted by a plurality of interconnected radially movable segments, each segment having a generally U-shaped cross-section and having an inner surface portion and an outer surface portion, the inner surface portion of each segment having first and second symmetrical conical surfaces inclined at an angle $\lambda$ with respect to axis D for cooperating with corresponding ones of the conical surfaces of angle $\lambda$ of the first and second flanges to move the flanges together upon the segments being moved radially inwardly, and the outer surface portion having third and fourth symmetrical conical surfaces inclined at an angle $\mu$ with respect to axis D for cooperating with corresponding ones of the conical surfaces of angle $\mu$ of the clips, and means for bringing the clips together longitudinally along axis D so as to move said plurality of segments radially inwardly and force said first and second parts together.

2. A device according to claim 1, wherein said angle $\lambda$ is relatively large in comparison with said angle $\mu$ and is close to 90°.

3. A device acoding the claim 2, wherein said angles $\lambda$ and $\mu$ are complimentary angles such that $\mu = 90° - \lambda$.

4. A device according to claim 3, wherein said angle $\mu$ is approximately 15°.

5. A device according to claim 1, further comprising means for loosely interconnecting said plurality of segments so as to allow radial displacement of said segments and movement of said segments with respect to one another.

6. A device according to claim 5, wherein said interconnecting means comprises a strap located at said outer surface portion of said segments.

7. A device according to claim 5, wherein said interconnecting means comprises springs disposed between adjacent segments within recesses provided on the segments, and a washer disposed about said plurality of segments within a groove formed in said outer surface portion of the segments.

8. A device according to claim 5, wherein said interconnecting means comprises a pair of rings constituted by flat washers disposed about said plurality of segments within a groove formed in said outer surface portion of the segments, said pair of rings having formed therein cooperating oppositely inclined slots, and a pin passing through said slots and connected to said outer surface portion, such that upon rotation of the rings relative to one another said plurality of segments are moved radially inwardly.

9. A device according to claim 1, wherein the means for bringing together the clips is constituted by an annular member having a flange which bears on one of the clips and which cooperates with the other clip by means of a thread on an outer peripheral surface of such other clip.

10. A device according to claim 1, wherein the means for bringing together the clips is constituted by bolts, disposed to pass through cooperating passages formed in the clips.

11. A device according to claim 1, wherein the means for bringing together the clips is constituted by jacks.

12. A device according to claim 1, wherein the segments forming the ring are connected by a flexible strap fixed to the segments and said strap has a closing device.

13. A device according to claim 1, wherein the segments forming the ring are connected to one another by springs, fixed in recesses provided on the segments, and by a washer located in a groove on the segments.

14. A device according to claim 1, wherein the segments forming the ring are constituted by two rings, a first ring having radial slots in each segment and a second ring having inclined slots on each segment, the first and second rings being juxtaposed in a groove made in the outer peripheral surface of the segments, each segment having a spindle passing through the slots of each of the rings.

15. A device according to claim 1, wherein at least one of the conical surfaces made on the clips and on the outer peripheral surfaces of the segments of the ring is constituted by two cones having different angles.

* * * * *